United States Patent
Takikawa et al.

(10) Patent No.: US 9,823,019 B2
(45) Date of Patent: Nov. 21, 2017

(54) MICROWAVE IRRADIATING AND HEATING DEVICE

(71) Applicant: Mitsubishi Electric Corporation, Chiyoda-ku (JP)

(72) Inventors: Michio Takikawa, Chiyoda-ku (JP); Yoshio Inasawa, Chiyoda-ku (JP); Yukihiro Honma, Chiyoda-ku (JP); Takuro Sasaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/319,666

(22) PCT Filed: Apr. 16, 2015

(86) PCT No.: PCT/JP2015/061721
§ 371 (c)(1),
(2) Date: Dec. 16, 2016

(87) PCT Pub. No.: WO2016/009691
PCT Pub. Date: Jan. 21, 2016

(65) Prior Publication Data
US 2017/0131032 A1     May 11, 2017

(30) Foreign Application Priority Data

Jul. 17, 2014   (JP) .................................. 2014-146811

(51) Int. Cl.
*F27D 11/12*   (2006.01)
*H05B 6/64*   (2006.01)
(Continued)

(52) U.S. Cl.
CPC ............. *F27D 11/12* (2013.01); *B01J 19/126* (2013.01); *H05B 6/64* (2013.01); *H05B 6/80* (2013.01);
(Continued)

(58) Field of Classification Search
None
See application file for complete search history.

(56) References Cited

U.S. PATENT DOCUMENTS

2009/0026195 A1   1/2009   Miyake et al.
2014/0017156 A1   1/2014   Nagata et al.

FOREIGN PATENT DOCUMENTS

EP   0 701 862 A1   3/1996
JP   2013-11384 A   1/2013
(Continued)

OTHER PUBLICATIONS

International Search Report dated Jun. 9, 2015 in PCT/JP2015/061721 filed Apr. 16, 2015.
(Continued)

*Primary Examiner* — Kishor Mayekar
(74) *Attorney, Agent, or Firm* — Oblon, McClelland, Maier & Neustadt, L.L.P.

(57) ABSTRACT

A microwave irradiating and heating device including a reaction furnace for containing a sample material to be irradiated with microwave and to be heated, a lid provided for the reaction furnace and having a single hole, a microwave irradiating source for emitting a microwave, the microwave irradiating source being disposed outside the reaction furnace, and a rotated quadric surface mirror for reflecting the microwave emitted from the microwave irradiating source into the reaction furnace through the hole of the lid, the rotated quadric surface mirror being disposed above the reaction furnace.

15 Claims, 8 Drawing Sheets

(51) Int. Cl.
  *H05B 6/80* (2006.01)
  *B01J 19/12* (2006.01)
(52) U.S. Cl.
  CPC .......................... *B01J 2219/0871* (2013.01);
              *B01J 2219/1215* (2013.01);
              *B01J 2219/1266* (2013.01);
              *B01J 2219/1275* (2013.01)

(56) References Cited

FOREIGN PATENT DOCUMENTS

| | | |
|---|---|---|
| JP | 2014-15381 A | 1/2014 |
| WO | 94/26408 A1 | 11/1994 |
| WO | 2006/098180 A1 | 9/2006 |
| WO | 2010/087464 A1 | 8/2010 |
| WO | 2014/054276 A1 | 4/2014 |
| WO | 2014/115704 A1 | 7/2014 |
| WO | 2016/017217 A1 | 2/2016 |
| WO | 2016/017218 A1 | 2/2016 |

OTHER PUBLICATIONS

Sato et al., "Conceptual Design of Industrial Microwave Applicators Using a Phased Array Antenna," The Fifth Symposium on Japan Society of Electromagnetic Wave Energy Applications, Proceedings 2B07, 2011, pp. 98-99 (2 pages).

Takigawa et al., "A Study of the Microwave Steel Manufacture System Applying Microwave Energy Transmission Technology," 2013 Institute of Electronics, Information and Communication Engineers General Conference, Proceedings B-1-13, 2013, (1 page).

MICROWAVE IRRADIATING AND HEATING DEVICE

TECHNICAL FIELD

The present disclosure relates to a microwave irradiating and heating device for heating a sample material by irradiating the sample material with microwaves.

BACKGROUND ART

In the field of microwave transmission, various researches and developments have been conducted. For example, beam control techniques using an active phased array antenna (APAA) and efficient transmission techniques have been in research and development, aiming at putting solar power satellites (SPS) into practice.

Further, efforts have been made to apply microwave transmission techniques to industrial applications. For example, patent literatures 1 and 2 disclose a steel manufacturing system that manufactures molten pig iron by irradiating a raw material with a microwave and heating this raw material. Further, nonpatent literatures 1 and 2 disclose techniques for using a phased array antenna as a microwave radiation source in a steel manufacturing system that uses the microwave. Furthermore, a technique for reducing the time required for chemical reaction by applying the microwave to chemical reaction has received attention recently.

The microwave transmission technique is applied to small-scale devices in many cases at the present time, though there is a demand for development of large-scale and large-electric-power devices such as steel manufacturing systems.

CITATION LIST

Patent Literature

Patent Literature 1: WO No. 2010/087464 entitled "Vertical Microwave Smelting Furnace."
Patent Literature 2: Japanese Unexamined Patent Application Publication No. 2013-11384 entitled "Microwave Oven."

Non Patent Literature

Non Patent Literature 1: Sato, Nagata, Shinohara, Mitani, Kashimura, "Conceptual Design of Industrial Microwave Applicators Using a Phased Array Antenna", The Fifth Symposium on Japan Society of Electromagnetic Wave Energy Applications, Proceedings 2B07 (2011).
Non Patent Literature 2: Takigawa, Honma, Sasaki, Inasawa, Konishi, "A Study of the Microwave Steel Manufacture System Applying Microwave Energy Transmission Technology", 2013 Institute of Electronics, Information and Communication Engineers General Conference, Proceedings B-1-13 (2013).

SUMMARY OF INVENTION

Technical Problem

In the conventional microwave heating systems disclosed in patent literatures 1 and 2, and nonpatent literatures 1 and 2, microwave irradiating sources are arranged on a circumference of or circumferentially around the reaction furnace. Thus, the microwave that is emitted from a microwave irradiating source (referred to as a "first microwave irradiating source" from here on) to the sample material, which is an object to be heated, but that is not absorbed by the sample material reflects on the sample material and is irradiated on another microwave irradiating source (referred to as a "second microwave irradiating source" from here on) that is arranged facing the first microwave irradiating source with respect to the reaction furnace. Because of this reflection, there arises a problem that a failure occurs on the second microwave irradiating source. Further, because the state of the sample material put into the reaction furnace may be various forms, such as solid, liquid, gas and powder, according to the product to be obtained, there is a problem that the sample material gets out of the reaction furnace when the reaction furnace is not equipped with a lid.

The present disclosure has been made in order to solve the above-mentioned problems, and it is therefore an object of the present disclosure to provide a microwave irradiating and heating device that can confine a microwave and a sample material within the reaction furnace.

Solution to Problem

A microwave irradiating and heating device according to the present disclosure includes: a reaction furnace for containing a sample material to be irradiated with microwave and to be heated; a lid provided for the reaction furnace and having a single hole; a microwave irradiating source for emitting a microwave, the microwave irradiating source being disposed outside the reaction furnace; a rotated quadric surface mirror for reflecting the microwave emitted from the microwave irradiating source into the reaction furnace through the hole of the lid, the rotated quadric surface mirror being disposed above the reaction furnace; and a rugged portion for reflecting irregularly the microwave, the rugged portion being provided on a surface of the lid, facing the interior space of the reaction furnace, in an area other than the hole on the surface.

Advantageous Effects of Invention

Because the microwave irradiating and heating device according to the present disclosure is configured as above, the microwave irradiating and heating device can confine the microwave and the sample material within the reaction furnace.

BRIEF DESCRIPTION OF DRAWINGS

FIG. 1 is a diagram showing the configuration of a microwave irradiating and heating device according to Embodiment 1 of the present disclosure, and FIG. 1(*a*) is a top plan view and FIG. 1(*b*) is a sectional side view;

FIG. 3 is a diagram showing the configuration of a microwave irradiating and heating device according to Embodiment 2 of the present disclosure, and FIG. 3(*a*) is a top plan view and FIG. 3(*b*) is a sectional side view;

FIG. 4 is a diagram showing the configuration of a microwave irradiating and heating device according to Embodiment 3 of the present disclosure, and FIG. 4(*a*) is a top plan view and FIG. 4(*b*) is a sectional side view;

DESCRIPTION OF EMBODIMENTS

Hereafter, preferred embodiments of the present disclosure are explained in detail with reference to the drawings.

Embodiment 1

Figure 1A:
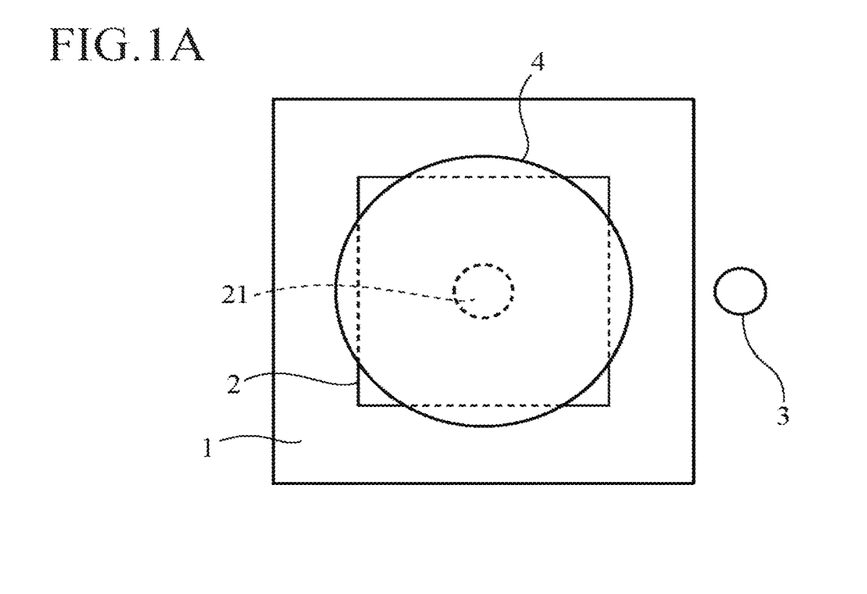
Figure 1B:
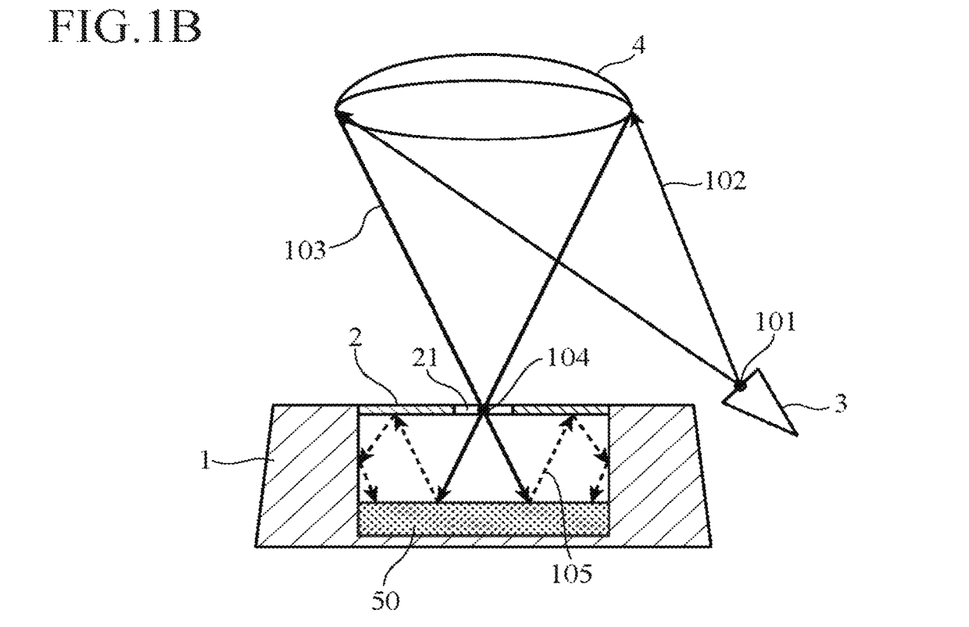

FIG. 1 is a diagram showing the configuration of a microwave irradiating and heating device according to Embodiment 1 of the present disclosure.

The microwave irradiating and heating device includes a reaction furnace 1, a lid 2, a microwave irradiating source 3, and a rotated quadric surface mirror 4, as shown in FIG. 1.

The reaction furnace 1 is a housing for containing a sample material 50 and for causing the sample material 50 to be irradiated with microwave and to be reacted and heated, and has an opening on an upper side thereof (on a side facing the rotated quadric surface mirror 4). The shape of the reaction furnace 1 may be selected appropriately according to the form or characteristics of the sample material 50 to be reacted. The shape of the reaction furnace 1, which is illustrated as rectangle in FIG. 1, is not limited to the figure. The reaction furnace 1 may have any shapes, for example, circle.

Figure 2:
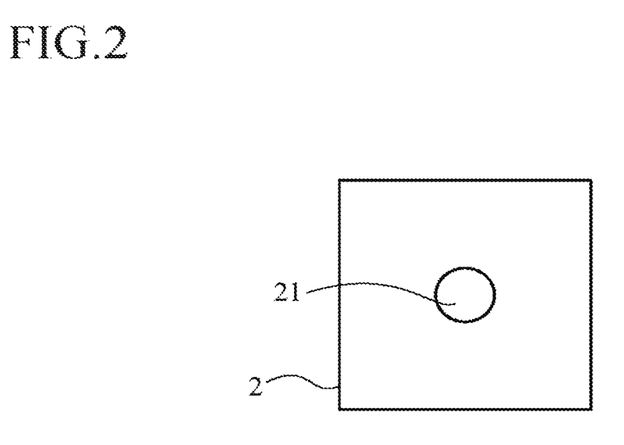
FIG. 2 is a top plan view showing the configuration of a lid in Embodiment 1 of the present disclosure.

The lid 2 is provided for the reaction furnace 1 and has a hole 21. In Embodiment 1, as shown in FIGS. 1 and 2, the lid 2 is illustrated as having a single hole 21. Although paths of the emitted microwave are illustrated in a geometrical optics manner in FIG. 1, an actual microwave has wave effect and exhibits a broadening of wave called beam waist in the vicinity of the focal point. This beam waist depends on the shape or position of the rotated quadric surface mirror 4. Therefore, the shape or size of the hole 21 formed in the lid 2 is selected appropriately according to the shape or position of the rotated quadric surface mirror 4. The shape of the hole 21, which is illustrated as circle in FIG. 1, is not limited to the figure. The hole 21 may have any shapes, for example, rectangle.

The microwave irradiating source 3 is disposed outside the reaction furnace 1, and emits microwaves to react with the sample material 50. In Embodiment 1 shown in FIG. 1, a single microwave irradiating source is provided. Type of the microwave irradiating source 3, frequency of emitted microwave and the like may be selected appropriately. The direction of a microwave emitted from the microwave irradiating source 3 is a direction toward the rotated quadric surface mirror 4.

The rotated quadric surface mirror 4 is disposed above the reaction furnace 1, and reflects the microwave emitted from the microwave irradiating source 3 into the reaction furnace 1 through the hole 21 of the lid 2. As shown by the incident wave 102, the microwave emitted from the microwave irradiating source 3 (a first focal point 101) is made incident upon the rotated quadric surface mirror 4. After that, the microwave reflected by the rotated quadric surface mirror 4 is converged at the hole 21 of the lid 2 (a second focal point 104), as shown by the incident wave 103. Thus, the rotated quadric surface mirror 4 has the first and second focal points 101, 104 at the positions of the microwave irradiating source 3 and the hole 21 of the lid 2, respectively. Note that FIG. 1 shows the rotated quadric surface mirror as spheroidal mirror.

The materials of the reaction furnace 1, the lid 2 and the rotated quadric surface mirror 4 may be selected appropriately.

Next, the operation of the microwave irradiating and heating device configured as above is explained.

When a microwave is emitted from the microwave irradiating source 3, this microwave is once converged at the position of the hole 21 of the lid 2 by and via the rotated quadric surface mirror 4, and then is diverged and irradiated on the sample material 50 contained within the reaction furnace 1. A part of the microwave irradiating the sample material 50 reacts with the sample material 50 and is absorbed as heat by the sample material 50, while the remaining microwave which is not absorbed is reflected as a reflected wave 105 in the direction opposite to the incident direction on to the sample material 50.

In the present disclosure, because the lid 2 is disposed in the upper side of the reaction furnace 1, the microwave is reflected by this lid 2 and again is irradiated on the sample material 50. As a result, the sample material 50 is heated efficiently. Even if a portion of the microwave leaks out from the hole 21 of the lid 2, the amount of such leakage is very small compared with the propagation loss in the device. Therefore, such leakage does not cause the breakdown of the microwave irradiating source 3. Further, because the lid 2 is provided for the reaction furnace 1, there is no need to worry about the sample material 50 getting out of the reaction furnace 1.

As described above, since the microwave irradiating and heating device according to Embodiment 1 includes the rotated quadric surface mirror 4, the reaction furnace 1, and the lid 2 that has the hole 21 and provided for the reaction furnace 1, the microwave and the sample material 50 can be confined within the reaction furnace 1. As a result, failures can be prevented from occurring in the microwave irradiating source 3, and the sample material 50 can be prevented from getting out. In addition, because the microwave can be confined within the reaction furnace 1, the microwave reflected by the sample material 50 can be used effectively within the reaction furnace 1, that is, be irradiated on the sample material 50 again. Therefore, there is provided an advantageous effect of improving the efficiency of energy.

Embodiment 2

Figure 3A:
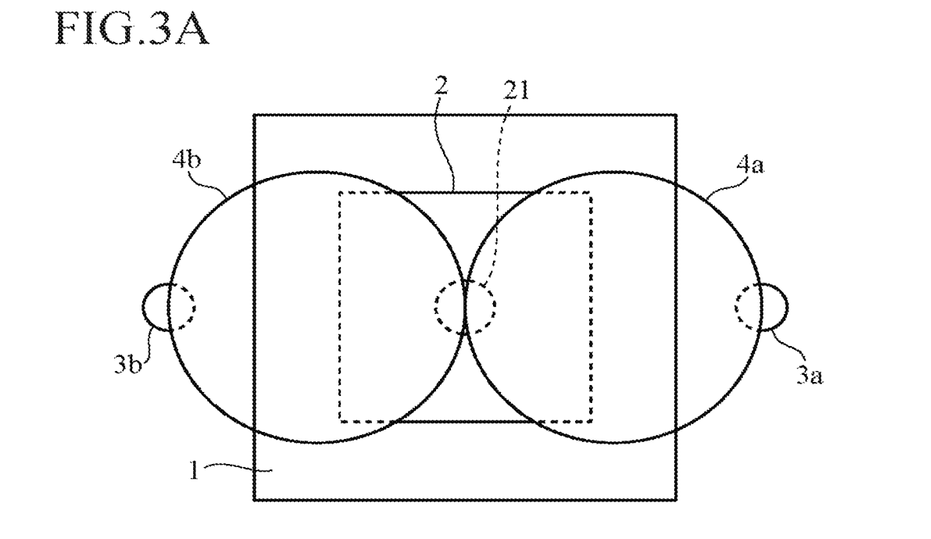
Figure 3B:
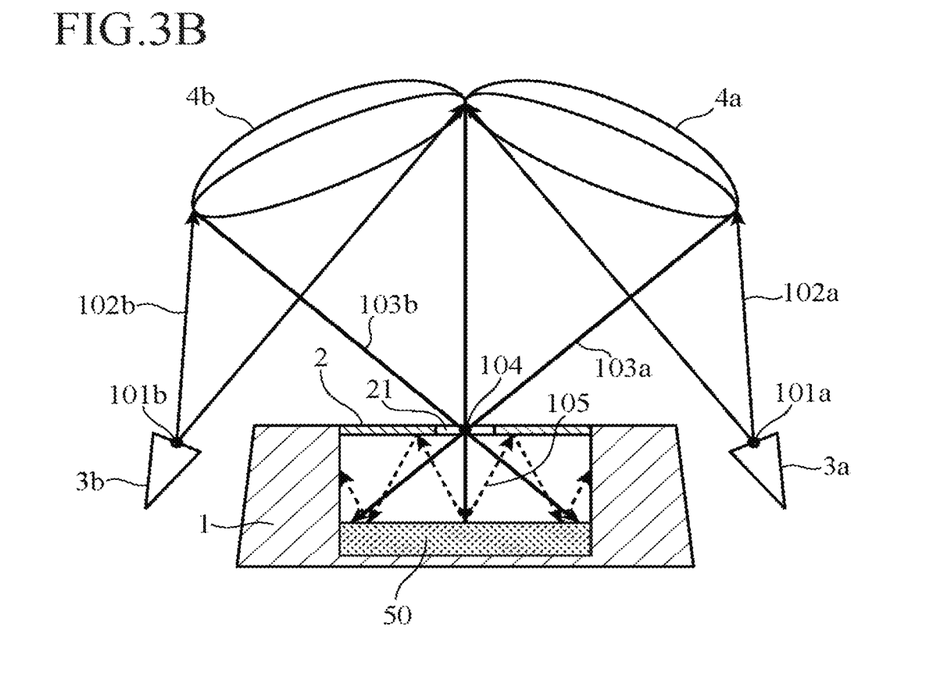

FIG. 3 is a diagram showing the configuration of a microwave irradiating and heating device according to Embodiment 2 of the present disclosure. The microwave irradiating and heating device according to Embodiment 2 shown in FIG. 3 is composed of two systems each including the microwave irradiating source 3 and the rotated quadric surface mirror 4, provided for the microwave irradiating and heating device according to Embodiment 1 as shown in FIG. 1. A second focal point 104 of each system is set at the position of a hole 21 of a lid 2. In order to distinguish between the systems in the diagram, suffix symbols (a, b) are attached to the reference numerals denoting the components of the systems. The other components are the same as those according to Embodiment 1, and are denoted by the same reference numerals and the explanation of the components is omitted hereafter.

In this embodiment, the microwave irradiating sources 3 and the rotated quadric surface mirrors 4 are disposed in such a way that each first focal point 101 is placed at the position of the corresponding microwave irradiating source 3 of the systems, and that the second focal points 104 are placed at the hole 21 of the lid 2. Although the embodiment shown in FIG. 3 is composed of two systems each including the microwave irradiating source 3 and rotated quadric surface mirror 4, three or more such systems may be provided. The number of systems is not limited by the figure.

As described above, in the microwave irradiating and heating device according to Embodiment 2, a plurality of systems each including the microwave irradiating source 3 and the rotated quadric surface mirror 4 are provided, and the second focal point 104 of each system is placed at the position of the hole 21 of the lid 2. Also in this configuration, advantageous effects similar to those provided by Embodiment 1 are provided.

Embodiment 3

Figure 4A:
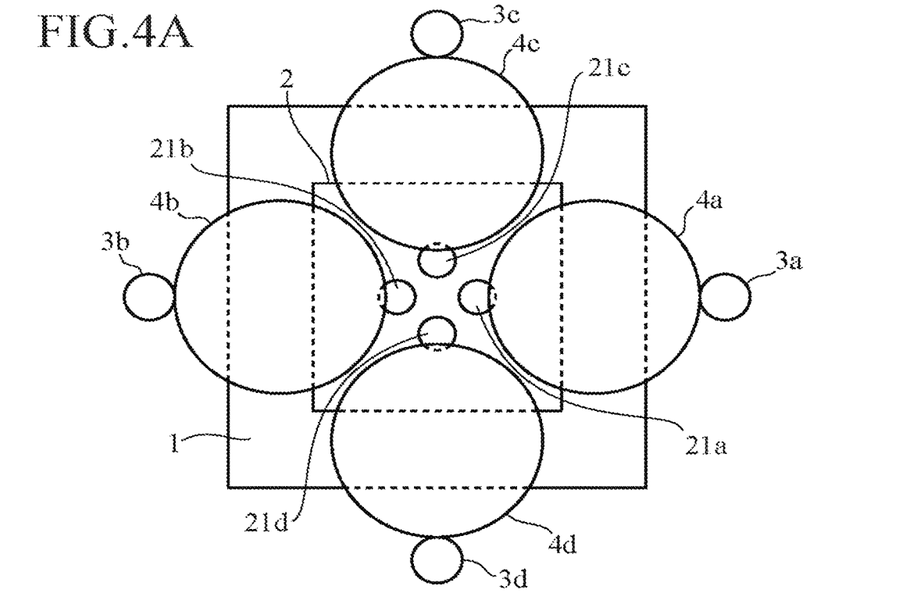
Figure 4B:
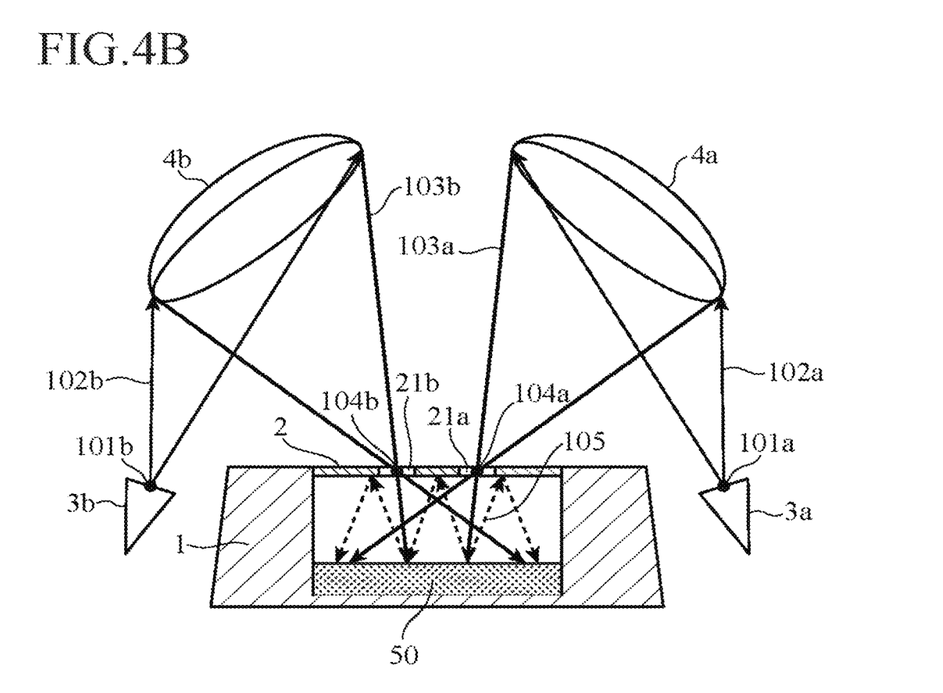
Figure 5:
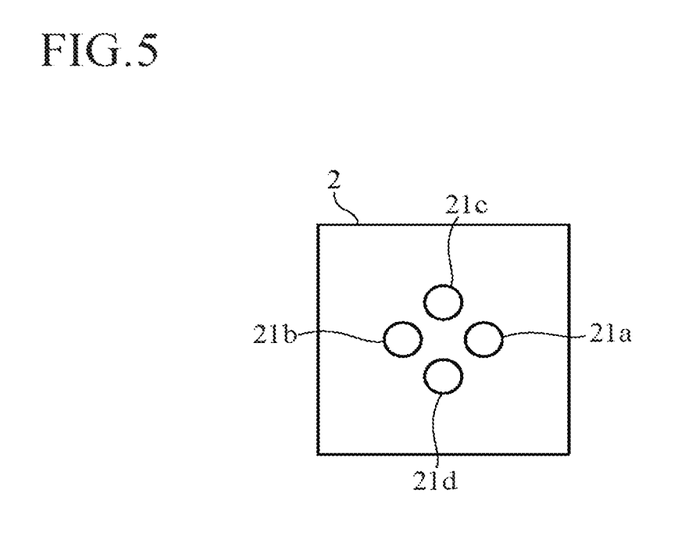
FIG. 5 is a top plan view showing the configuration of a lid in Embodiment 3 of the present disclosure.

FIG. 4 is a diagram showing the configuration of a microwave irradiating and heating device according to Embodiment 3 of the present disclosure, and FIG. 5 is a top plan view showing the configuration of a lid 10. The microwave irradiating and heating device according to Embodiment 3 shown in FIGS. 4 and 5 is composed of four systems each including the microwave irradiating source 3 and the rotated quadric surface mirror 4, provided for the microwave irradiating and heating device according to Embodiment 1 as shown in FIG. 1. In this embodiment, a lid 2 has four holes 21, and second focal points 104 are placed at the positions of holes 21 different from each other. In order to distinguish between the systems in the diagram, suffix symbols (a to d) are attached to the reference numerals denoting the components of the systems. The other components are the same as those according to Embodiment 1, and are denoted by the same reference numerals and the explanation of the components is omitted hereafter.

In this embodiment, the microwave irradiating sources 3 and the rotated quadric surface mirrors 4 are disposed in such a way that each first focal point 101 is placed at the position of the corresponding microwave irradiating source 3 of the systems, and that each second focal point 104 is placed at the position of the corresponding hole 21 of the lid 2. Although the embodiment shown in FIG. 4 has four systems each including the microwave irradiating source 3 and the rotated quadric surface mirror 4, the number of systems is not limited to four. There may be provided two or more systems in which a corresponding number of holes 21 are provided in the lid 2.

As described above, in the microwave irradiating and heating device according to Embodiment 3, a plurality of systems each including the microwave irradiating source 3 and the rotated quadric surface mirror 4 are provided, a plurality of holes 21 whose number is equal to the number of systems is formed in the lid 2, and the second focal points 104 of the systems are placed at the positions of the holes 21 different from each other in the lid 2. Also in this configuration, advantageous effects similar to those provided by Embodiments 1 and 2 are provided.

Embodiment 4

Figure 6:
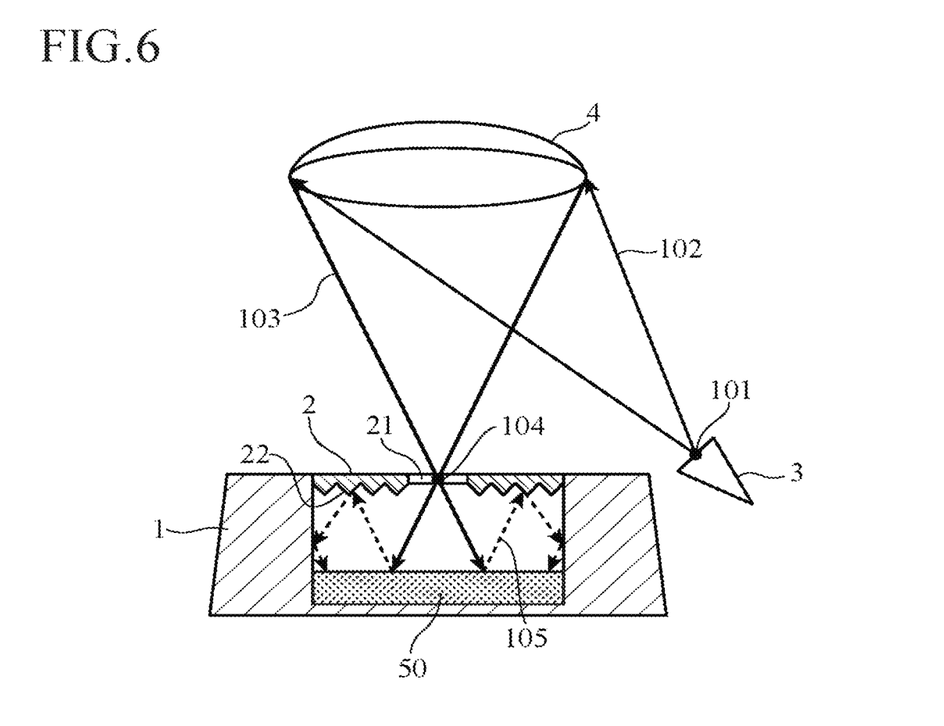
FIG. 6 is a sectional side view showing the configuration of a microwave irradiating and heating device according to Embodiment 4 of the present disclosure.

FIG. 6 is a diagram showing the configuration of a microwave irradiating and heating device according to Embodiment 4 of the present disclosure.

In the microwave irradiating and heating device according to Embodiment 4 shown in FIG. 6, a rugged portion 22 is provided on the back surface of the lid 2 (i.e., the surface facing the interior space of the reaction furnace 1) of the microwave irradiating and heating device according to Embodiment 1 shown in FIG. 1. The other components are the same as those according to Embodiment 1, and are denoted by the same reference numerals and the explanation of the components is omitted hereafter.

The rugged portion 22 is provided on the back surface of the lid 2, and reflects irregularly the microwave reflected within the reaction furnace 1. The material, shape, or type of the rugged portion 22 may be selected appropriately. By forming the rugged portion 22, the reflected microwave 105 from the sample material 50 is made to reflect more complicatedly and more times within the reaction furnace 1 than the configuration according to Embodiment 1 shown in FIG. 1, thereby providing an advantageous effect of reducing the microwave leakage from the hole 21 of the lid 2.

As described above, because in the microwave irradiating and heating device according to Embodiment 4 the rugged portion 22 is formed on the back surface of the lid 2, there are provided advantageous effects of heating the sample material 50 more efficiently and of reducing the leakage of the microwave from the hole 21, in addition to the advantageous effects provided by Embodiment 1.

In the above description the case in which the rugged portion 22 is applied to the configuration according to Embodiment 1 shown in FIG. 1 is shown. The rugged portion may be applied similarly to the configuration according to Embodiment 2 or 3 shown in FIGS. 3 to 5, which provides the same or similar advantageous effects.

Embodiment 5

Figure 7:
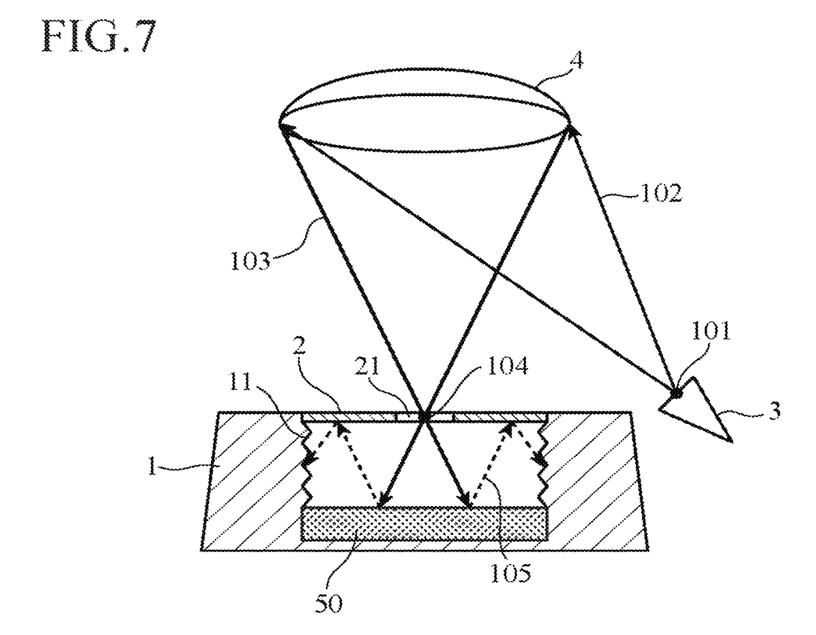
FIG. 7 is a sectional side view showing the configuration of a microwave irradiating and heating device according to Embodiment 5 of the present disclosure.

FIG. 7 is a diagram showing the configuration of a microwave irradiating and heating device according to Embodiment 5 of the present disclosure.

In the microwave irradiating and heating device according to Embodiment 5 shown in FIG. 7, a rugged portion 11 is provided on the inner side walls of the reaction furnace 1 of the microwave irradiating and heating device according to the Embodiment 1 shown in FIG. 1. The other components are the same as those according to Embodiment 1, and are denoted by the same reference numerals and the explanation of the components is omitted hereafter.

The rugged portion 11 is provided on the inner side walls of the reaction furnace 1, and reflects irregularly the microwave reflected within the reaction furnace 1. The material, shape, or type of the rugged portion 11 may be selected appropriately. By forming the rugged portion 11, the reflected microwave 105 from the sample material 50 is made to reflect more complicatedly and more times within the reaction furnace 1 than the configuration according to Embodiment 1 shown in FIG. 1, thereby providing an advantageous effect of reducing the microwave leakage from the hole 21 of the lid 2.

As described above, because in the microwave irradiating and heating device according to this Embodiment 5 the rugged portion 11 is provided on the inner side walls of the reactor 1, there are provided advantageous effects of heating the sample material 50 more efficiently and of reducing the leakage of the microwave from the hole 21, in addition to the advantageous effects provided by Embodiment 1.

In the above description the case in which the rugged portion 11 is applied to the configuration according to Embodiment 1 shown in FIG. 1 is shown. The rugged portion may be applied similarly to the configuration according to Embodiment 2 or 3 shown in FIGS. 3 to 5, which provides the same or similar advantageous effects.

Embodiment 6

Figure 8:
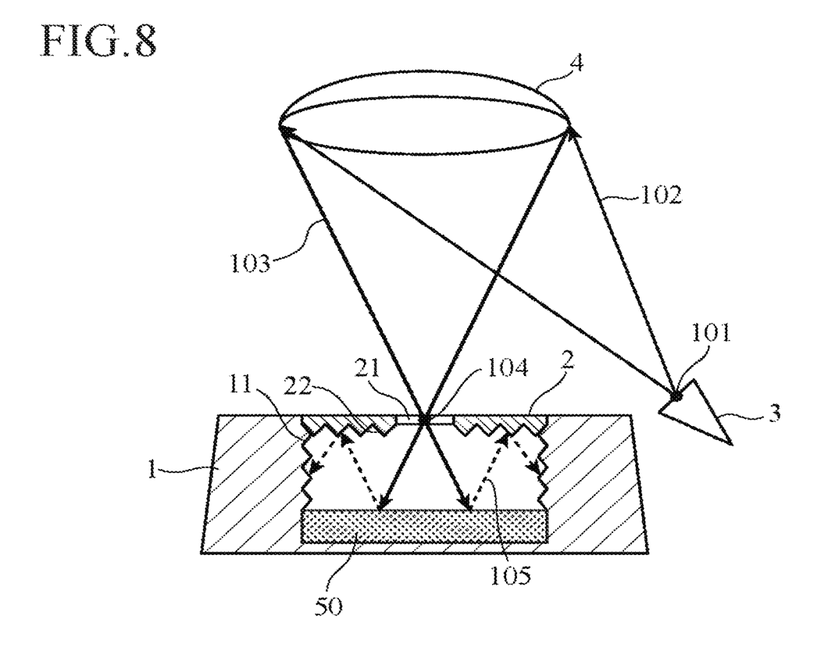
FIG. 8 is a sectional side view showing the configuration of a microwave irradiating and heating device according to Embodiment 6 of the present disclosure.

FIG. 8 is a diagram showing the configuration of a microwave irradiating and heating device according to Embodiment 6 of the present disclosure.

In the microwave irradiating and heating device according to Embodiment 6 shown in FIG. 8, a rugged portion 22 is provided on the back surface of the lid 2 (i.e., the surface facing the interior space of the reaction furnace 1) of the microwave irradiating and heating device according to Embodiment 1 shown in FIG. 1, and a rugged portion 11 is provided on the inner side walls of the reaction furnace 1. The other components are the same as those according to Embodiment 1, and are denoted by the same reference numerals and the explanation of the components is omitted hereafter.

The rugged portion 22 is provided on the back surface of the lid 2, and reflects irregularly the microwave reflected within the reaction furnace 1. Further, the rugged portion 11 is provided on the inner side walls of the reaction furnace 1, and reflects irregularly the microwave reflected within the reaction furnace 1. The material, shape, or the type of the rugged portions 11, 22 may be selected appropriately. By forming the rugged portions 11, 22, the reflected microwave 105 from the sample material 50 is made to reflect more complicatedly and more times within the reaction furnace 1 than the configuration according to Embodiment 1 shown in FIG. 1, thereby providing an advantageous effect of reducing the microwave leakage from the hole 21 of the lid 2.

As described above, because in the microwave irradiating and heating device according to Embodiment 6 the rugged portion 22 is provided on the back surface of the lid 2 and the rugged portion 11 is provided on the inner side walls of the reaction furnace 1, there are provided advantageous effects of heating the sample material 50 more efficiently and of reducing the leakage of the microwave from the hole 21, in addition to the advantageous effects provided by Embodiment 1.

In the above description the case in which the rugged portions 11, 22 are applied to the configuration according to Embodiment 1 shown in FIG. 1 is shown. The rugged portion may be applied similarly to the configuration according to Embodiment 2 or 3 shown in FIGS. 3 to 5, which provides the same or similar advantageous effects.

Further, in Embodiments 4 to 6, the rugged portions 11, 22 may have, for example, the form of a plane on which triangular prisms are arranged, or a plane on which triangular pyramids, pyramids or semi-spheres are arranged. That is, the rugged portion may have any shapes that provide the advantageous effect of reflecting and diffusing the microwave.

Embodiment 7

Figure 9:
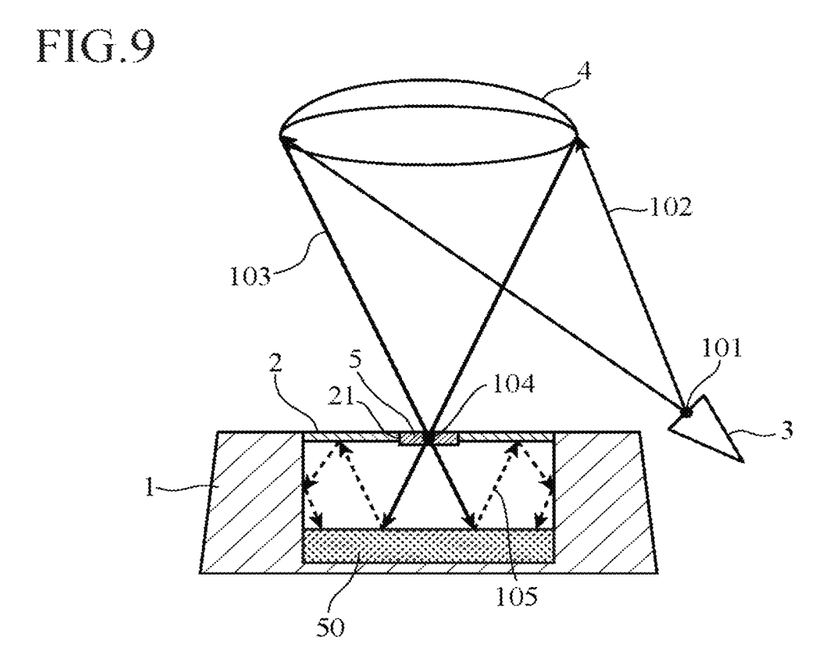
FIG. 9 is a sectional side view showing the configuration of a microwave irradiating and heating device according to Embodiment 7 of the present disclosure.
Figure 10:
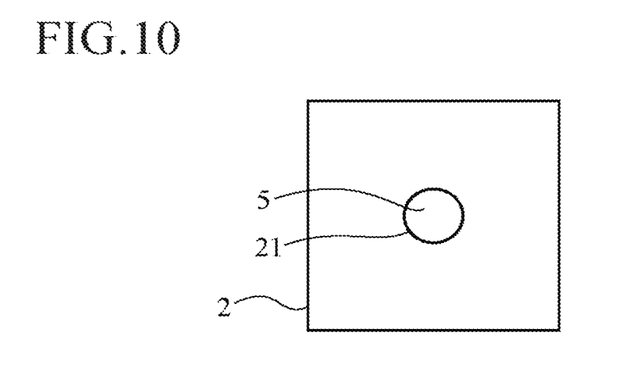
FIG. 10 is a top plan view showing the configuration of a lid in Embodiment 7 of the present disclosure.

FIG. 9 is a diagram showing the configuration of a microwave irradiating and heating device according to Embodiment 7 of the present disclosure, and FIG. 10 is a top plan view showing the configuration of a lid 10. In the microwave irradiating and heating device according to Embodiment 7 shown in FIGS. 9 and 10, a cover 5 is disposed in the hole 21 of the lid 2 of the microwave irradiating and heating device according to Embodiment 1 shown in FIG. 1. The other components are the same as those according to Embodiment 1, and are denoted by the same reference numerals and the explanation of the components is omitted hereafter.

The cover 5 is disposed in the hole 21 of the lid 2, but allows microwaves to pass therethrough. The material of the cover 5 may be selected appropriately as long as the cover 5 allows the microwave to pass therethrough. By covering the hole 21 of the lid 2 with the cover 5, the sample material 50 are securely confined in the reaction furnace 1.

As described above, because in the microwave irradiating and heating device according to Embodiment 7 the cover 5 is disposed in the hole 21 of the lid 2, there is provided an advantageous effect of reducing the leakage of the sample material 50 from the hole 21, in addition to the advantageous effects provided by Embodiment 1.

In the above description the case in which the cover 5 is applied to the configuration according to Embodiment 1 shown in FIG. 1 is shown. The cover may be applied similarly to the configuration according to any of Embodiments 2 to 6 shown in FIGS. 3 to 8, which provides the same or similar advantageous effect.

Embodiment 8

Figure 11:
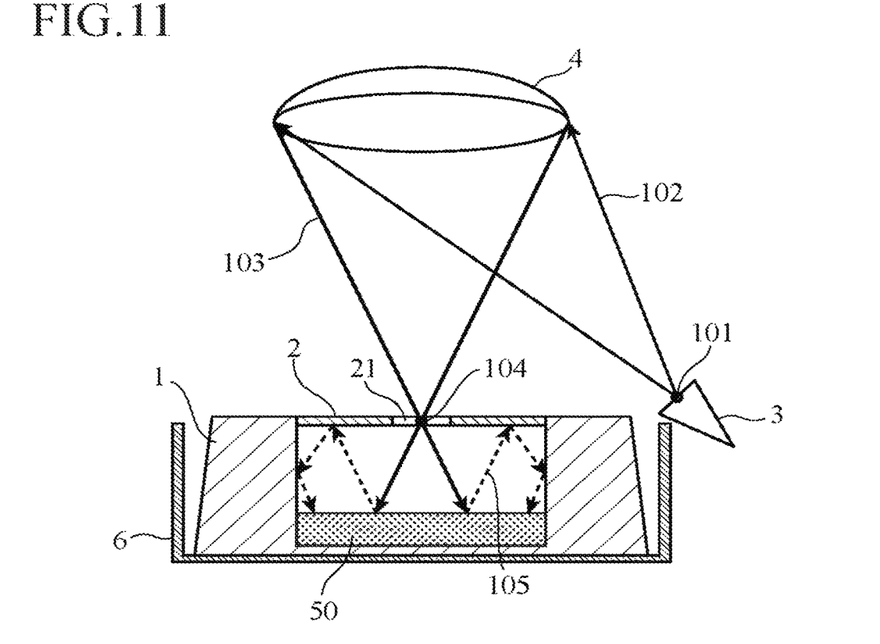
FIG. 11 is a sectional side view showing the configuration of a microwave irradiating and heating device according to Embodiment 8 of the present disclosure.

FIG. 11 is a diagram showing the configuration of a microwave irradiating and heating device according to Embodiment 8 of the present disclosure.

In the microwave irradiating and heating device according to Embodiment 8 shown in FIG. 11, a heater 6 is provided to the microwave irradiating and heating device according to Embodiment 1 shown in FIG. 1. The other components are the same as those according to Embodiment 1, and are denoted by the same reference numerals and the explanation of the components is omitted hereafter.

The heater 6 is disposed outside the reaction furnace 1, and heats the reaction furnace 1. A method or device for heating used in the heater 6 may be selected appropriately. In addition to heating the sample material 50 with the microwave, heating the reaction furnace 1 with the heater 6 increases the temperature inside the reaction furnace. As a result of this, the reaction rate of the sample material 50 is improved.

As described above, because the microwave irradiating and heating device according to this Embodiment 8 includes the heater 6 for heating the reaction furnace 1, an advantageous effect of heating the sample material 50 more efficiently is obtained, in addition to the advantageous effects provided by Embodiment 1.

In the above description the case in which the heater 6 is applied to the configuration according to Embodiment 1 shown in FIG. 1 is shown. The heater may be applied similarly to the configuration according to any of Embodiments 2 to 7 shown in FIGS. 3 to 9, which provides the same or similar advantageous effect.

Embodiment 9

Figure 12:
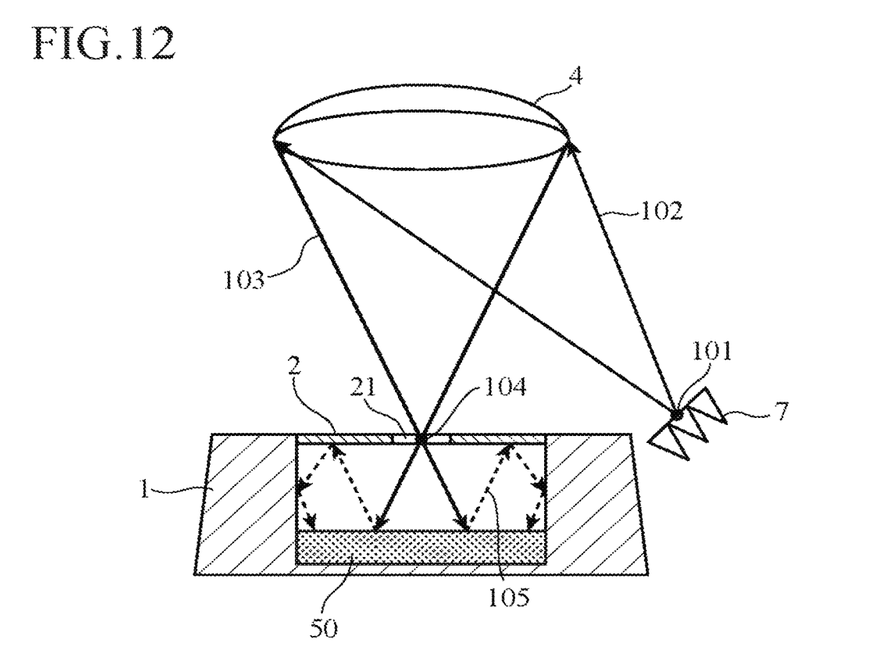
FIG. 12 is a sectional side view showing the configuration of a microwave irradiating and heating device according to Embodiment 9 of the present disclosure.

FIG. 12 is a diagram showing the configuration of a microwave irradiating and heating device according to Embodiment 9 of the present disclosure.

In the microwave irradiating and heating device according to Embodiment 9 shown in FIG. 12, the microwave irradiating source 3 of the microwave irradiating and heating device according to Embodiment 1 shown in FIG. 1 is embodied as an active phased array antenna 7. The other components are the same as those according to Embodiment 1, and are denoted by the same reference numerals and the explanation of the components is omitted hereafter.

The active phased array antenna 7 includes amplifiers and phase shifters, each set of an amplifier and a phase shifter is provided for each antenna element or sub-array having antenna elements. By optimizing amplification amount of each amplifier and phase amount of each phase shifter, the irradiation distribution of the microwave irradiated on the sample material 50 can be flexibly controlled. Amplification amounts and phase amounts may be adjusted appropriately to attain a target irradiation distribution.

As described above, because in the microwave irradiating and heating device according to Embodiment 9 the active phased array antenna 7 that can adjust freely the amplitude and the phase of the emitted microwave is used as the microwave irradiating source 3, there is provided an advantageous effect of being able to control flexibly the microwave irradiation distribution to the sample material 50, in addition to the advantageous effects provided by Embodiment 1.

In the above description the case in which the active phased array antenna 7 is applied to the configuration according to Embodiment 1 shown in FIG. 1 is shown. The active phased array antenna can be applied similarly to the configuration according to any of Embodiments 2 to 8 shown in FIGS. 3 to 11, which provides the same or similar advantageous effects.

Further, in Embodiments 1 to 9, the position of a second focal point 104 is not necessary to be set strictly at the position of the hole 21 of the lid 2; the position of the second focal point 104 may be placed over or under the position of the hole 21 of the lid 2. Even if the position of the second focal point 104 and the position of the hole 21 do not coincide strictly, the heating effect does not change greatly. However, it is preferable to set the second focal point 104 at the position of the hole 21 of the lid 2 because this configuration allows for making the diameter (size) of the hole 21 small, considering the beam waist, to prevent the sample material 50 from getting out of the reaction furnace. Note that it can be expected that a greater heating effect is attained in the case in which the focal point is set on the surface of the sample material 50, depending on the quantity of the sample material 50.

Although in Embodiments 1 to 9 the lid 2 is illustrated as a generally flat object, the lid 2 may have other shapes such as a curved object.

While the disclosure is described in its preferred embodiments, it is to be understood that combination, modification or omission of parts of embodiments described above may be made within the scope of the disclosure.

INDUSTRIAL APPLICABILITY

As described above a microwave irradiating and heating device according to the present disclosure includes: a reaction furnace for containing a sample material to be irradiated with microwave and to be heated; a lid provided for the reaction furnace and having a single hole; a microwave irradiating source for emitting a microwave, the microwave irradiating source being disposed outside the reaction furnace; a rotated quadric surface mirror for reflecting the microwave emitted from the microwave irradiating source into the reaction furnace through the hole of the lid, the rotated quadric surface mirror being disposed above the reaction furnace; and a rugged portion for reflecting irregularly the microwave, the rugged portion being provided on a surface of the lid, facing the interior space of the reaction furnace, in an area other than the hole on the surface. Because of this configuration, the microwave irradiating and heating device can confine the microwave and the sample material within the reaction furnace. Accordingly, the microwave irradiating and heating device is suitable for heating sample materials.

REFERENCE SIGNS LIST 1 reaction furnace, 2 lid, 3, 3a to 3d microwave irradiating source, 4, 4a to 4d rotated quadric surface mirror, 5 cover, 6 heater, 7 active phased array antenna, 11 rugged portion, 21, 21a to 21d hole, 22 rugged portion, 50 sample material, 101, 101a, 101b first focal point, 102, 102a, 102b incident wave, 103, 103a, 103b incident wave, 104, 104a, 104b second focal point, and 105 reflected wave.

The invention claimed is:

1. A microwave irradiating and heating device comprising:
a reaction furnace for containing a sample material to be irradiated with microwave and to be heated;
a lid provided for the reaction furnace and having a single hole;
a microwave irradiating source for emitting a microwave, the microwave irradiating source being disposed outside the reaction furnace;
a rotated quadric surface mirror for reflecting the microwave emitted from the microwave irradiating source into the reaction furnace through the hole of the lid, the rotated quadric surface mirror being disposed above the reaction furnace; and
a rugged portion for reflecting irregularly the microwave, the rugged portion being provided on a surface of the lid, facing an interior space of the reaction furnace, in an area other than the hole on the surface.

2. The microwave irradiating and heating device according to claim 1, further comprising another rugged portion for reflecting irregularly the microwave, the rugged portion being provided on an inside wall of the reaction furnace.

3. The microwave irradiating and heating device according to claim 1, further comprising a cover provided for the hole of the lid, the cover allowing the microwave to pass therethrough.

4. The microwave irradiating and heating device according to claim 1, further comprising a heater for heating the reaction furnace, the heater being disposed outside the reaction furnace.

5. The microwave irradiating and heating device according to claim 1, wherein the microwave irradiating source is an active phased array antenna that can adjust freely an amplitude and phase of the microwave emitted therefrom.

6. A microwave irradiating and heating device comprising:
a reaction furnace for containing a sample material to be irradiated with microwave and to be heated;

a lid provided for the reaction furnace and having a single hole;

a plurality of microwave irradiating sources for emitting a microwave, the plurality of microwave irradiating sources being disposed outside the reaction furnace; and a plurality of rotated quadric surface mirrors, each of the plurality of rotated quadric surface mirrors being provided correspondingly to each of the plurality of microwave irradiating sources, being disposed above the reaction furnace, and being for reflecting the microwaves emitted from the corresponding microwave irradiating source into the reaction furnace through the hole of the lid; and a rugged portion for reflecting irregularly the microwave, the rugged portion being provided on a surface of the lid, facing an interior space of the reaction furnace, in an area other than the hole on the surface.

7. The microwave irradiating and heating device according to claim 6, further comprising another rugged portion for reflecting irregularly the microwave, the rugged portion being provided on an inside wall of the reaction furnace.

8. The microwave irradiating and heating device according to claim 6, further comprising a cover provided for the hole of the lid, the cover allowing the microwave to pass therethrough.

9. The microwave irradiating and heating device according to claim 6, further comprising a heater for heating the reaction furnace, the heater being disposed outside the reaction furnace.

10. The microwave irradiating and heating device according to claim 6, wherein the microwave irradiating sources are an active phased array antenna that can adjust freely an amplitude and phase of the microwave emitted therefrom.

11. A microwave irradiating and heating device comprising:

a reaction furnace for containing a sample material to be irradiated with microwave and to be heated;

a lid provided for the reaction furnace and having a plurality of holes;

a plurality of microwave irradiating sources for emitting a microwave, the plurality of microwave irradiating sources being disposed outside the reaction furnace; and a plurality of rotated quadric surface mirrors, each of the plurality of rotated quadric surface mirrors being provided correspondingly to each of the plurality of microwave irradiating sources, being disposed above the reaction furnace, and being for reflecting the microwaves emitted from the corresponding microwave irradiating source into the reaction furnace through the respective holes of the lid; and a rugged portion for reflecting irregularly the microwave, the rugged portion being provided on a surface of the lid, facing an interior space of the reaction furnace, in an area other than the hole on the surface.

12. The microwave irradiating and heating device according to claim 11, further comprising another rugged portion for reflecting irregularly the microwave, the rugged portion being provided on an inside wall of the reaction furnace.

13. The microwave irradiating and heating device according to claim 11, further comprising covers provided for the respective holes of the lid, the covers allowing the microwave to pass therethrough.

14. The microwave irradiating and heating device according to claim 11, further comprising a heater for heating the reaction furnace, the heater being disposed outside the reaction furnace.

15. The microwave irradiating and heating device according to claim 11, wherein the microwave irradiating sources are an active phased array antenna that can adjust freely an amplitude and phase of the microwave emitted therefrom.

* * * * *